US006383235B1

United States Patent

(12) United States Patent
Maegawa et al.

(10) Patent No.: US 6,383,235 B1
(45) Date of Patent: *May 7, 2002

(54) CATHODE MATERIALS, PROCESS FOR THE PREPARATION THEREOF AND SECONDARY LITHIUM ION BATTERY USING THE CATHODE MATERIALS

(75) Inventors: Takeyuki Maegawa; Ayumi Nozaki; Fusaoki Uchikawa, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,803

(22) PCT Filed: Sep. 26, 1997

(86) PCT No.: PCT/JP97/03422

§ 371 Date: Aug. 20, 1998

§ 102(e) Date: Aug. 20, 1998

(87) PCT Pub. No.: WO98/29915

PCT Pub. Date: Jul. 9, 1998

(51) Int. Cl.[7] .......................... H01M 4/04; H01M 4/58; C01D 1/02; C01G 45/02; C01G 53/04

(52) U.S. Cl. ................ 29/623.5; 429/231.1; 429/231.3; 423/594; 423/599; 423/641; 423/642; 423/643

(58) Field of Search ............................ 29/623.1, 623.5; 429/231.1, 231.3, 231.95; 423/592–596, 599, 632, 641, 642, 643

(56) References Cited

U.S. PATENT DOCUMENTS 4,548,983 A * 10/1985 Yokota et al. .............. 524/726
5,147,738 A * 9/1992 Toyoguchi
5,352,269 A * 10/1994 McCandlish et al. ......... 75/351

FOREIGN PATENT DOCUMENTS

| | | |
|---|---|---|
| JP | 2-9722 | * 1/1990 |
| JP | 3-201368 | 9/1991 |
| JP | 7-78611 | 3/1995 |
| JP | 7-142065 | * 6/1995 |
| JP | 8-148147 | * 6/1996 |
| JP | 8-171910 | 7/1996 |
| JP | 8-264184 | 10/1996 |
| JP | 8-290917 | 11/1996 |
| JP | 8-329945 | * 12/1996 |

* cited by examiner

*Primary Examiner*—Gabrielle Brouillette
*Assistant Examiner*—Jonathan Crepeau
(74) *Attorney, Agent, or Firm*—Oblon, Spivak, McClelland, Maier & Neustadt, P.C.

(57) ABSTRACT

A process of preparation capable of easily preparing cathode materials having a homogeneous composition in a good mass productivity, a cathode material obtained by this process, and a secondary lithium ion battery using the cathode material. Aqueous solutions of each of a lithium salt, a transition metal salt, and a complexing agent are prepared and mixed in a stoichiometric ratio of a cathode material, and therefrom water is removed by spray-drying to give a precursor which is then sintered. High performance secondary lithium ion batteries are obtained by using the obtained cathode material in the positive electrode.

16 Claims, 2 Drawing Sheets

1: Cathode material layer
5: Separator
6: Anode material layer

1: Cathode material layer

5: Separator

6: Anode material layer

CATHODE MATERIALS, PROCESS FOR THE PREPARATION THEREOF AND SECONDARY LITHIUM ION BATTERY USING THE CATHODE MATERIALS

TECHNICAL FIELD

The present invention relates to a cathode material used in secondary lithium ion batteries containing a non-aqueous solution as an electrolyte, a process for the preparation thereof, and a secondary lithium ion battery using the cathode material.

BACKGROUND ART

In recent years, with progress of miniaturization of electronic equipments such as cellular phones and portable terminals, higher potential and higher capacity performances are demanded for batteries used in these equipments. Thus, great hopes have been entertained of secondary lithium ion batteries using a non-aqueous solution as an electrolyte which have a large discharge capacity per unit weight and/or per unit volume, and development thereof has been made in various fields.

Layer compounds which can electrochemically undergo lithium intercalation and deintercalation are used as the cathode material in the secondary lithium ion batteries, and composite compounds of lithium and a transition metal as represented by the formula $LiMO_2$ wherein M is a transition metal element, such as $LiCoO_2$, $LiNiO_2$ and $LiFeO_2$, have been used as the cathode material. These composite oxides are obtained usually by mixing a lithium compound such as lithium carbonate or lithium oxide with a transition metal oxide or hydroxide such as nickel oxide or cobalt oxide in a predetermined ratio, and sintering the mixture in air or in oxygen at a temperature of 700 to 900° C. for several hours, as disclosed in U.S. Pat. No. 4,302,518 and U.S. Pat. No. 4,980,080.

For the purpose of increasing the capacity or improving the charge/discharge cycling performance, there are proposed $LiNi_xCo_{1-x}O_2$, which has a combined composition of these composite oxides, as disclosed in Japanese Patent Publication Kokai No. 63-299056, and addition of a trace amount of an element such as Al or Ti as disclosed in Japanese Patent Publication Kokai No. 5-242891. However, among the above cathode materials, a cathode material put to practical use at present is only $LiCoO_2$ that a relatively stable capacity is obtained.

The above-mentioned $LiCoO_2$ composite oxide is often synthesized by a conventional dry powder method because the synthesis is relatively easy, and it has been obtained by dry-mixing a lithium compound such as lithium carbonate, lithium oxide or lithium hydroxide with a cobalt compound such as cobalt oxide or cobalt hydroxide and sintering the mixture at a high temperature of about 900° C.

However, the dry powder method has a limit in homogeneous mixing. In particular, dry mixing of a lithium compound having a low density with a transition metal compound having a high density is difficult to achieve homogeneous mixing due to a difference in density. This non-homogeneity of a mixed powder becomes a cause of disorder of cathode material crystal structure, so the mobility of lithium ion in a layer structure of the cathode material is lowered to result in lowering of battery capacity.

Also, since in the disordered portion the layer structure is unstable and the interlayer bonding force is weak, the layer structure is destroyed as the intercalation and deintercalation of lithium ion proceeds, so the disorder contributes to deterioration of the cycling performance. That is to say, the above-mentioned composite oxide obtained by the above-mentioned conventional dry powder method has a capacity much lower than the theoretical capacity and still leave room for improvement.

Thus, in order to achieve homogeneous mixing of respective elements which constitute the cathode materials, there is attempted a wet method wherein the mixing is effected in the state of ions by dissolving a salt of the lithium compound and a salt of the transition metal compound in water to form an aqueous solution. For example, Japanese Patent Publications Kokai No. 5-325966 and No. 6-44970 disclose a process for preparing a cathode material by dissolving salts of transition metal and lithium in a suitable solvent for the mixing by wet methods and sintering the resultant.

In this process, lithium and the transition metal are mixed in the state of ions and accordingly a very homogeneous mixing is achieved in the aqueous solution, but the process has a problem that it is very difficult to obtain a desired homogeneous precursor, because the homogeneity is not kept when removing the solvent such as water, and a segregated salt is formed with a coexisting anion, so the respective components are present separately.

In order to solve this problem, a method for preparing a coprecipitate of a plurality of ions by addition of a suitable precipitant (coprecipitation method) is investigated.

However, the coprecipitation method is very general method and is not suitable for coprecipitation of elements greatly different in chemical properties like in the case of alkali metal ions (lithium ion) and transition metal ions. They precipitate separately and, therefore, it is difficult to achieve a homogeneity of precipitate by this method.

A method wherein a complexing agent capable of forming a composite complex with a cation present in the solution is added (complex method) is also investigated. In this case, the both cations which are herein lithium ion and transition metal ion, form a composite complex and, as a result, a homogeneity of ion mixing in the state of composite complex can be maintained.

For example, Japanese Patent Publication No. 6-203834 discloses a complex method by adding ethylene glycol to lithium salt of acetic acid and a transition metal salt of acetic acid to prepare a complex alcoholate, removing ethylene glycol to form a gel and sintering the gel to obtain a cathode material. Also, Japanese Patent Publications Kokai No. 6-163046 and No. 7-142065 disclose a complex method by subjecting a solution of a salt of a lithium compound, a salt of a transition metal compound and citric acid to a dehydration polymerization to form a gel and sintering the gel to obtain a cathode material.

However, the complex method encounters a problem in a means for removing the solvent from the composite complex If various complexing agents are used, a complex ion wherein a plurality of element ions form a complex can be present at least in the solution, but this state is not always maintained when the solvent is removed, thus resulting in formation of a precursor (gel) with poor homogeneity which is not distinct from the conventional dry powder method.

That is to say, the solvent is gradually removed from the composite complex over a very long time and, as a result, ethylene glycol or citric acid undergoes a dehydration polymerization to form a gel (precursor). The produced gel forms a network which can hold water therein. The precursor is dissolved again in water which has not been able to be removed during the dehydration polymerization or water from air, and forms separate salts with a coexisting anion such as acetic acid radical or nitric acid radical to precipitate. Thus, a deviation in composition generates and the homogeneity achieved in the stage of producing the complex in the solution is impaired after the removal of solvent.

Also, since the cathode materials used in secondary lithium ion batteries are apt to be easily damaged by water, wet methods using the complex method as mentioned above which has a possibility that water remains in the stage of a gel state, are not suitable for the synthesis of the cathode materials.

Further, since the above wet method is a reaction accompanied by gelation, it has a problem of handling that a viscous gel is hard to handle.

Also, since the above-mentioned wet methods require a large amount of a coprecipitaing agent or a large amount of a complexing agent such as ethylene glycol and accordingly a long time is required for the precipitation or the dehydration polymerization, they have a problem that the yield of the precursor is low. Furthermore, since it is required to pass through complicated production steps such as drying under reduced pressure, the methods are not a practical synthesis method for batteries using a large amount of a cathode material.

Spray drying is known as a method for drying a powder. The spray drying is often used for the purpose of preparing particles, but there is a report that the spray drying is applied to a cathode material. For example, J. R. Dahn, U. von Sacken and C. A. Michal, Solid State Ionics, 44, 87–97 (1990) discloses a method of the synthesis of $LiNiO_2$ wherein an aqueous solution of LiOH and an $Ni(OH)_2$ powder are mixed to form a slurry, and the slurry is spray-dried to prepare a precursor of $Ni(OH)_2$ powder coated with LiOH, followed by sintering the precursor to give a cathode material. Japanese Patent Publication Kokai No. 2-9722 discloses a method for preparing a manganese oxide powder wherein an aqueous solution of a manganese compound and a lithium compound is formed into a mist by using a ultrasonic humidifier to give a Li—Mn oxide precursor, and the precursor is then sintered to give a cathode material.

However, these spray-drying methods are utilized only for coating onto the surface of particles or for removing solvent, and are not a method which provides cathode materials having excellent performances.

Also, in case of drying in the form of a mist, a mixed solution (containing no complexing agent) obtained from solutions of only raw material components containing a plurality of ions, there arises a problem that the solution is dried eventually in the state that the respective ions are separated.

The present invention has been made in order to solve the above problems, and objects of the present invention are to obtain a cathode material having a homogeneous composition for secondary lithium ion batteries and a process for preparing the same with ease and in a good mass productivity, and to obtain a high performance secondary lithium ion battery using this cathode material.

DISCLOSURE OF THE INVENTION

The first process for preparing a cathode material according to the present invention comprises the steps of obtaining an aqueous solution of a water-soluble salt of lithium, a water-soluble salt of at least one transition metal element selected from Ni, Co, Mn and Fe and a complexing agent capable of forming a complex with said lithium and said transition metal element, removing a solvent of said aqueous solution by spray-drying to give a precursor, and heat-treating said precursor. The cathode material having an excellent homogeneity can be synthesized in a good mass productivity by this process.

The second process for preparing a cathode material according to the present invention is a process that in the first process, the metal element ions in said solution are lithium ion, Ni or Co ion and Mn ion, and the ratio of lithium ion:Ni or Co ion:Mn ion is 1:1−y:y ($0.01 \leqq y \leqq 0.3$). By this process, a cathode material precursor having very homogeneous and stable composition is obtained, and a high performance cathode material is obtained by heat-treating (sintering) this precursor. This cathode material has a small size, and micro-pores open to an electrolyte are formed in the inside and surface of the particles, so not only the surface area (specific surface area) contacting the electrolyte is increased, but also the valency of Ni or Co and the crystalline structure in the cathode material are stable at the time of charge and discharge, thus the battery performances can be improved.

The third process for preparing a cathode material according to the present invention is a process that in the first process, the water-soluble salt is any of a nitrate, a sulfate, a chloride, a fluoride, an acetate and a hydroxide, whereby it is possible to homogeneously mix lithium and the transition metal in the aqueous solution.

The fourth process for preparing a cathode material according to the present invention is a process that in the first process, the complexing agent is any of oxalic acid, tartaric acid, citric acid, succinic acid, malonic acid and maleic acid. By this process, a complex can be easily obtained, so the synthesis can be performed in a good mass productivity.

The fifth process for preparing a cathode material according to the present invention is a process that in the first process, the spray-drying is carried out at an atmospheric temperature of 160 to 220° C., whereby the cathode material having an excellent homogeneity is obtained.

The sixth process for preparing a cathode material according to the present invention is a process that in the first process, the spraying pressure of the spray-drying is from 0.5 to 2.0 MPa By this process, the cathode material having a spherical or analogous shape which is advantageous for dense packing of the cathode material in the positive electrode can be easily obtained, and the cathode material having a particle size of 0.5 to 5.0 μm which is suitable for secondary batteries can be obtained without giving damage such as pulverization.

The seventh process for preparing a cathode material according to the present invention is a process that in the first process, the heat treating temperature (sintering temperature) is from 500 to 850° C., whereby the lithium component in the cathode material is prevented from subliming or scattering during the sintering, so an ideal cathode material according to stoichiometric ratio can be obtained and the battery performances can be improved by applying it to the positive electrode of batteries.

The first cathode material according to the present invention is one obtained by removing a solvent by spray-drying from an aqueous solution of a water-soluble salt of lithium, a water-soluble salt of at least one transition metal element selected from Ni, Co, Mn and Fe and a complexing agent capable of forming a complex with said lithium and said transition metal element, and heat-treating the resultant. It is excellent in homogeneity.

The second cathode material according to the present invention is a cathode material that in the first cathode material, the metal element ions in the solution are Li ion, Ni or Co ion and Mn ion, and the ratio of Li ion: Ni or Co ion: Mn ion is 1:1−y:y (0.01≦y≦0.3), whereby a cathode material precursor having a very homogeneous and stable composition is obtained and a high performance cathode material is obtained by heat-treating (sintering) this precursor. This cathode material has a small size, and micro-pores open to an electrolyte are formed in the inside and surface of the particles, so not only the surface area (specific surface area) contacting the electrolyte is increased, but also the valency of Ni or Co and the crystalline structure in the cathode material are stable at the time of charge and discharge, thus the battery performances can be improved.

The first secondary lithium ion battery according to the present invention comprises a cathode material layer of a positive electrode, an anode material layer of a negative electrode, and a separator provided between said cathode material layer and said anode material layer and retaining a non-aqueous electrolyte containing lithium ion, wherein said cathode material layer contains a cathode material obtained by removing a solvent from an aqueous solution of a water-soluble salt of lithium, a water-soluble salt of at least one transition metal element selected from Ni, Co, Mn and Fe and a complexing agent capable of forming a complex with said lithium and said transition metal element by spray-drying, and heat-treating the resultant, whereby a high performance secondary lithium ion battery is obtained.

The second secondary lithium ion battery according to the present invention is a battery that in the first secondary lithium ion battery, the metal element ions in said solution are lithium ion, Ni or Co ion and Mn ion, and the ratio of lithium ion:Ni or Co ion:Mn ion is 1:1−y:y (0.01≦y≦0.3), whereby a cathode material precursor having a very homogeneous and stable composition is obtained and a high performance cathode material is obtained by heat-treating (sintering) this precursor. This cathode material has a small size, and micro-pores open to an electrolyte are formed in the inside and surface of the particles, so not only the surface area (specific surface area) contacting the electrolyte is increased, but also the valency of Ni or Co and the crystalline structure in the cathode material are stable at the time of charge and discharge, thus the battery performances can be improved.

BEST MODE FOR CARRYING OUT THE INVENTION

Figure 1:
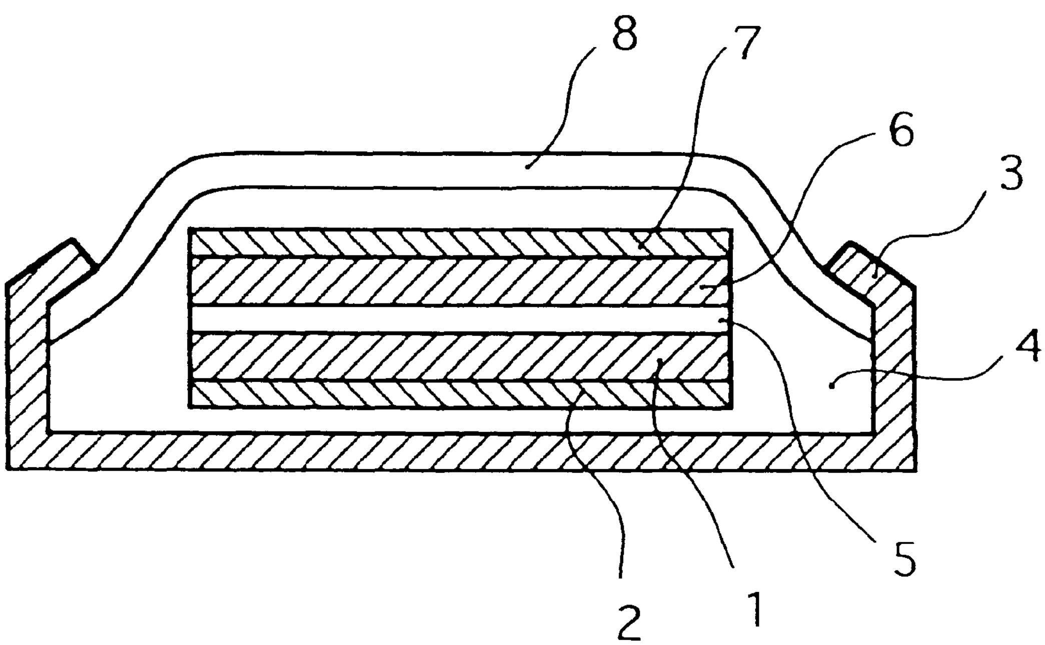
FIG. 1 is a cross section view showing the constitution of a secondary lithium ion battery in the first example according to the present invention.

The process for preparing a cathode material for use in secondary lithium ion batteries according to the present invention comprises the steps of obtaining an aqueous solution wherein lithium, at least one transition metal element selected from Ni, Co, Mn and Fe and a complexing agent are dissolved, to thereby from a composite complex in the aqueous solution, removing the solvent (water) of the aqueous solution containing the composite complex by using a spray-drying method as a dehydration means to give a precursor, and heat-treating (sintering) the precursor.

In the composite complex obtained in the aqueous solution, the respective ions stoichiometrically coordinate through the complexing agent and, therefore, the mixing state of the lithium ion and the transition metal ion is homogeneous.

Since the solvent of the aqueous solution is instantaneously removed by spray-drying, the drying can be achieved with maintaining the homogeneous mixing state of ions, so a long time reaction such as dehydration polymerization as conventionally conducted is not required and the yield is also high. Further, the precursor of the cathode material can be obtained without being subject to a bad influence of the solvent (water) remaining inside a gel or water in air.

A cathode material having a homogeneous composition can be obtained by sintering this precursor, and high battery performances can be achieved by applying it to the positive electrode of batteries.

Also, the spray-drying method used in the present invention is known to be advantageous for mass production from synthesis of ferrite powder and the like. By using the spray-drying method, it is possible to efficiently synthesize a large quantity of the precursor of the cathode material.

As the water-soluble salts of lithium or Ni, Co, Mn and Fe, there are used nitrates, sulfates, chlorides, fluorides, acetates or hydroxides.

It is desirable that the complexing agent used in the present invention is soluble in water and is an organic acid having hydroxyl group or carboxyl group which easily form a complex with the lithium ion and the transition metal ion, and any of oxalic acid, tartaric acid, citric acid, succinic acid, malonic acid and maleic acid is used.

Besides, EDTA (ethylenediamine tetraacetate), HEDTA (hydroxyethylenediamine triacetate) and the like are known as a complexing agent which forms a complex, but they have a problem that the battery performances are lowered, since a nitrogen compound remains in the precursor after the heat decomposition and becomes a cause of disorder of crystal structure.

The atmospheric temperature in the spray-drying is from 160 to 220° C., preferably from 180 to 200° C. If the temperature is less than 160° C., the precursor is insufficiently dried, and remaining of crystalline water and moisture absorption are marked. If the temperature is more than 220° C., the produced composite complex goes ahead with a reaction at a stretch up to the heat decomposition to turn to a highly hygroscopic oxide and, therefore, not only the desired object of homogeneous mixing cannot be achieved, but also the yield of the precursor is lowered and handling is also remarkably lowered.

Also, in the spray-drying, when the atmospheric temperature is within the above range and the spraying pressure is from 0.5 to 2.0 MPa, spherical cathode material having a particle size of 0.5 to 5.0 μm which is a size suitable for secondary batteries, can be obtained. If the spraying pressure is less than 0.5 MPa, proper liquid droplets are not produced by spraying. If the spraying pressure is more than 2.0 MPa, the liquid droplets become too small and also there is a risk that the drying path (space to be passed for drying) in an apparatus becomes short and the drying cannot be sufficiently made.

The size and shape of the cathode material powder largely depend on the size and shape of the precursor obtained by spray-drying. By controlling the conditions for spray-drying, the properties of the precursor are controlled, and by sintering such a precursor, spherical or analogous shape advantageous for the cathode material which forms the positive electrode of secondary batteries, can be obtained.

For example, spherical cathode materials having a particle size of 0.5 to 5.0 μm which is a size suitable for use in the positive electrode of secondary batteries can be obtained without giving damage such as pulverization by controlling the atmospheric temperature and the pressure in the spray-drying within the above ranges.

The particle size can also be controlled by adjusting the boiling point of the solution to be sprayed, the diameter of an atomizing nozzle and the like.

On the other hand, a positive electrode densely packed with the cathode material is desirable in raising the capacity per unit volume of the secondary battery. For this purpose, it is preferable that the cathode material has a spherical shape or a shape analogous thereto, which are advantageous for packing. In the synthesis of cathode materials by conventional dry methods or coprecipitation methods as mentioned above, it is difficult to control the shape of the cathode materials, and the shape has been governed by the anisotropy of crystal growth at the time of sintering.

Various battery performances such as charge/discharge performance and cycling performance are known to also depend on the size of the cathode material. In conventional dry methods as mentioned above, the desired size has been obtained by mechanical pulverization and classification of a cathode material powder after sintering. Therefore, since the cathode material powder suffers a damage in the crystals from the pulverization and since a reaction with a solvent used in the pulverization also occurs, the performances of the cathode material are remarkably deteriorated.

It is desirable that the sintering temperature of the precursor according to the present invention is from 500 to 850° C. If the sintering temperature is less than 500° C., the layer structure shown by $R\bar{3}m$ structure (hereinafter referred to as hexagonal crystal structure) does not sufficiently progress and the crystallinity is bad. If the sintering temperature is more than 850° C., lithium is scattered to result in deviation in the composition of the cathode material and there is a danger of reaching the decomposition.

On the other hand, since the above precursor according to the present invention is very rich in homogeneity and no impurity component such as moisture or solvent remain inside the precursor, it is excellent in reactivity and enables to conduct the sintering at a temperature lower than the sintering of the above-mentioned conventional dry methods by about 50 to about 150° C. Further, since the sintering temperature can be lowered, the lithium component in the cathode material can be prevented from scattering during the sintering, so an ideal cathode material according to stoichiometric ratio can be obtained, thus leading to improvement of battery performances.

More concrete examples and comparative examples are shown below.

EXAMPLE 1

A 0.2 M aqueous solution of lithium nitrate (made by Kojundo Kagaku Kabushiki Kaisha), a 0.2 M aqueous solution of cobalt nitrate (made by Kojundo Kagaku Kabushiki Kaisha) and a 0.2 M aqueous solution of tartaric acid (made by Kojundo Kagaku Kabushiki Kaisha) were prepared, and predetermined volumes of the solutions were measured so as to become the stoichiometric ratio of a cathode material and mixed. After stirring for 30 minutes, the mixed solution was spray-dried by using a spray dryer (trade mark: Pulvis GP22, made by Yamato Kagaku Kabushiki Kaisha). For the spraying of the liquid, an atomizing nozzle was used in combination with compressed air. The liquid was fed at a rate of 100 ml/minute, and the spraying was carried out at a pressure of 2.0 MPa and an atmospheric temperature of 200° C. to give an cathode material precursor. The yield of the precursor was not less than 95%.

The dried precursor was packed in a quartz boat and sintered in air at 800° C. for 10 hours to give a blackish brown powder. The cathode material obtained by this method was determined by an X-ray diffractometer (trade mark: System MXP18, made by Mac Science Kabushiki Kaisha, target: Cu—Kα radiation, lamp voltage-current: 40 kV-150 mA), and it was confirmed thereby that the cathode material was a single phase of $LiCoO_2$ having a hexagonal crystal structure. The size of the cathode material was measured by a centrifugal precipitation type size distribution analyzer (trade mark: SA-CP3, made by Shimadzu Corporation), and it was found that D50 is 2.5 μm.

FIG. 1 is a view showing the constitution of a secondary lithium ion battery of the first example according to the present invention using the cathode material obtained as above, wherein 1 is a cathode material layer of a positive electrode, 2 is a current collector of the positive electrode, 3 is a casing for the positive electrode, 4 is a gasket made of an insulating material, 5 is a separator retaining a non-aqueous electrolyte containing lithium ion, 6 is an anode material layer of a negative electrode, 7 is a current collector of the negative electrode, and 8 is a casing for the negative electrode.

In a glove box in an argon atmosphere, 90% by weight of the above cathode material, 5% by weight of acetylene black having an average particle size of 3.0 μm as a conductive material and 5% by weight of polyvinylidene fluoride (PVDF) as a binder component were weighed and mixed with N-methylpyrrolidone (NMP) as a solvent to give a paste. The paste was coated by a doctor blade onto an aluminum foil which served as positive electrode collector 2, vacuum-dried in an oven kept at 150° C. and pressed to give a molded body of cathode material layer 1.

Metallic lithium was used as anode material 6 and was placed in negative electrode casing 8 together with negative electrode collector 7. An ethylene carbonate (EC)/1,2-dimethoxyethane (DME)/1.0 M lithium perchlorate solution was used as an electrolyte, and was soaked into separator 5 made of a polypropylene non-woven fabric. The separator was put between the anode material 6 and the cathode material 1 and placed in the positive electrode casing 3 together with the positive electrode collector 2, and they were closely contacted by means of gasket 4 and sealed to give a coin-shaped cell shown in FIG. 1.

The charge/discharge test of the obtained cell was made in a constant current mode of 0.1 $mA/cm^2$ current density, provided that the upper limit of the charge voltage was 4.2 V. The results are shown in Table 1.

TABLE 1

| | Composition of cathode material | Discharge capacity (mAh/g) |
|---|---|---|
| Example 1 | $LiCoO_2$ | 187 |
| Example 2 | $LiNiO_2$ | 205 |
| Example 3 | $LiNi_xCo_{1-x}O_2$ | 216 |
| Example 4 | $LiFeO_2$ | 144 |
| Example 5 | $LiNiO_2$ | 201 |
| Example 6 | $LiMn_2O_4$ | 163 |
| Example 7 | $LiCo_{0.8}Mn_{0.2}O_2$ | 188 |

TABLE 1-continued

| | Composition of cathode material | Discharge capacity (mAh/g) |
|---|---|---|
| Example 8 | $LiNi_{0.85}Mn_{0.15}O_2$ | 208 |
| Example 9 | $LiCo_{0.45}Ni_{0.45}Mn_{0.10}O_2$ | 211 |
| Example 10 | $LiNi_{0.8}Mn_{0.2}O_2$ | 202 |
| Com. Ex. 1 | $LiCoO_2$ | 138 |
| Com. Ex. 2 | $LiNiO_2$ | 150 |
| Com. Ex. 3 | $LiNi_xCo_{1-x}O_2$ | 166 |
| Com. Ex. 4 | $LiFeO_2$ | 107 |
| Com. Ex. 5 | $LiNiO_2$ | 155 |
| Com. Ex. 6 | $LiMn_2O_4$ | 117 |
| Com. Ex. 7 | $LiCo_{0.8}Mn_{0.2}O_2$ | 140 |
| Com. Ex. 8 | $LiNi_{0.85}Mn_{0.15}O_2$ | 158 |
| Com. Ex. 9 | $LiCo_{0.45}Ni_{0.45}Mn_{0.10}O_2$ | 160 |
| Com. Ex. 10 | $LiNi_{0.8}Mn_{0.2}O_2$ | 149 |

EXAMPLE 2

A 0.2 M aqueous solution of lithium acetate (made by Wako Pure Chemical Industries, Ltd.), a 0.2 M aqueous solution of nickel acetate (made by Wako Pure Chemical Industries, Ltd.) and a 0.2 M aqueous solution of citric acid (made by Wako Pure Chemical Industries, Ltd.) were prepared, and predetermined volumes of the solutions were measured so as to become the stoichiometric ratio of a cathode material and mixed. After stirring for 30 minutes, the mixed solution was spray-dried by using the same spray dryer. as in Example 1. For the spraying of the liquid, an atomizing nozzle was used in combination with compressed air. The liquid was fed at a rate of 100 ml/minute, and the spraying was carried out at a pressure of 1.5 MPa and an atmospheric temperature of 190° C. to give a cathode material precursor. The yield of the precursor was not less than 95%.

Figure 2:
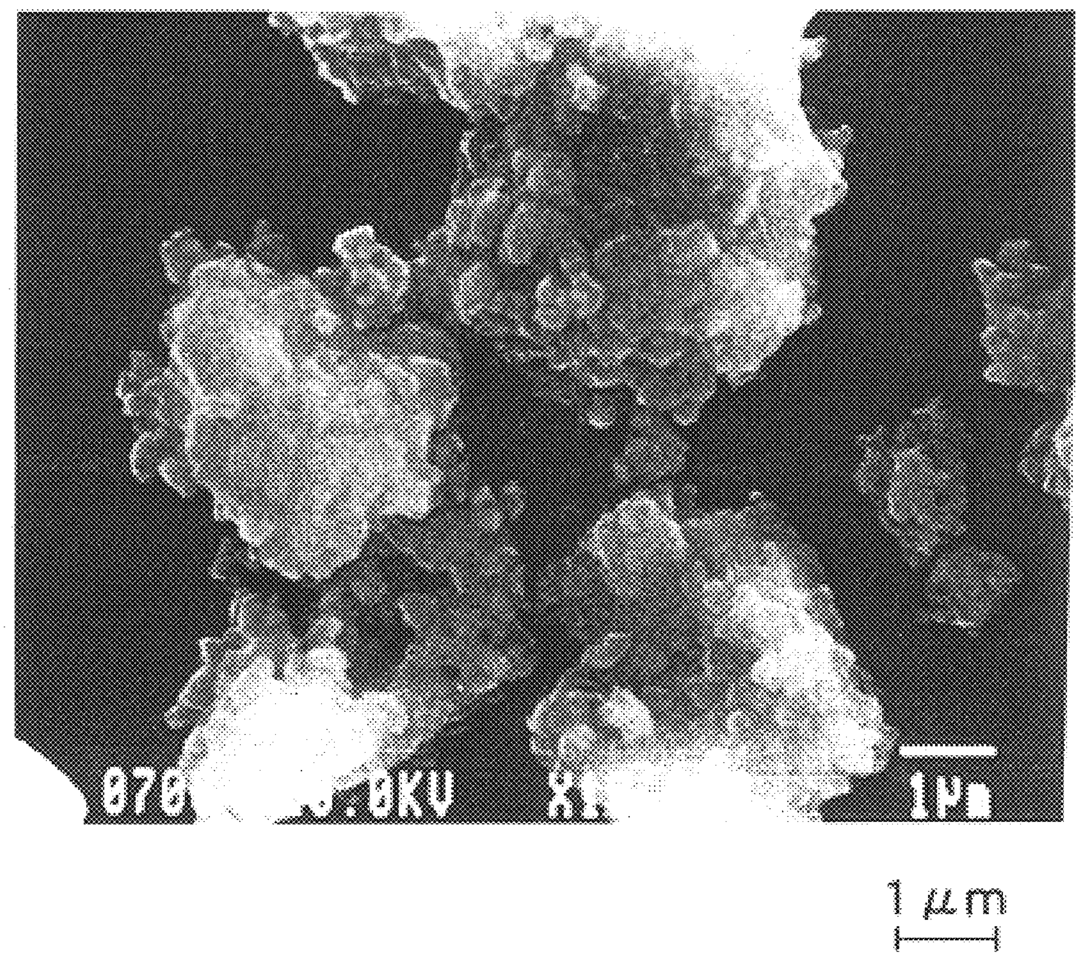
FIG. 2 is an SEM photograph showing particles of a cathode material powder in the second example according to the present invention.

The dried precursor was packed in a quartz boat and sintered in oxygen at 700° C. for 10 hours to give a blackish brown powder. The cathode material obtained by this method was determined by an X-ray diffractometer, and confirmed to be a single phase of $LiNiO_2$ having a hexagonal crystal structure. The measurement of size of the cathode material powder revealed that D50 is 4.0 $\mu$m. The shape of cathode material powder was also observed by SEM (Secondary Electron Microscopy) and was found to be spherical. FIG. 2 is an SEM photograph showing particles of the powder obtained in this Example.

By using this cathode material, a coin-shaped cell was fabricated in the same manner as in Example 1, and the charge/discharge test was made in the same manner. The results are shown in Table 1.

EXAMPLE 3

A 0.2 M aqueous solution of lithium chloride (made by Kojundo Kagaku Kabushiki Kaisha), a 0.2 M aqueous solution of cobalt chloride (made by Kojundo Kagaku Kabushiki Kaisha), a 0.2 M aqueous solution of nickel chloride (made by Kojundo Kagaku Kabushiki Kaisha) and a 0.2 M aqueous solution of oxalic acid (made by Wako Pure Chemical Industries, Ltd.) were prepared, and predetermined volumes of the solutions were measured so as to become the stoichiometric ratio of a cathode material and mixed. After stirring for 30 minutes, the mixed solution was spray-dried by using the same dryer as in Example 1 at a spraying pressure of 1.0 MPa and an atmospheric temperature of 220° C. to give a cathode material precursor. The yield of the precursor was not less than 95%.

The dried precursor was packed in a quartz boat and sintered in air at 750° C. for 10 hours to give a blackish brown powder.

The cathode material obtained by this method was determined by an X-ray diffractometer, and it was confirmed thereby that the cathode material was a single phase of $LiNi_xCo_{1-x}O_2$ having a hexagonal crystal structure. The measurement of size of the cathode material revealed that D50 is 5.0 $\mu$m.

By using this cathode material, a coin-shaped cell was fabricated in the same manner as in Example 1, and the charge/discharge test was made in the same manner. The results are shown in Table 1.

EXAMPLE 4

A 0.2 M aqueous solution of lithium sulfate (made by Kojundo Kagaku Kabushiki Kaisha), a 0.2 M aqueous solution of ferric sulfate (made by Wako Pure Chemical Industries, Ltd.) and a 0.2 M aqueous solution of malonic acid (made by Wako Pure Chemical Industries, Ltd.) were prepared, and predetermined volumes of the solutions were measured so as to become the stoichiometric ratio of a cathode material and mixed. After stirring for 30 minutes, the mixed solution was spray-dried by using the same dryer as in Example 1 at a spraying pressure of 0.5 MPa and an atmospheric temperature of 180° C. to give a cathode material precursor. The yield of the precursor was not less than 95%.

The dried precursor was packed in a quartz boat and sintered in air at 650° C. for 10 hours to give a blackish brown powder. The cathode material obtained by this method was determined by an X-ray diffractometer, and was confirmed to be a single phase of $LiFeO_2$ having a hexagonal crystal structure. The measurement of size of the cathode material revealed that D50 is 1.0 $\mu$m.

By using this cathode material, a coin-shaped cell was fabricated in the same manner as in Example 1, and the charge/discharge test was made in the same manner. The results are shown in Table 1.

EXAMPLE 5

A 0.2 M aqueous solution of lithium hydroxide (made by Kojundo Kagaku Kabushiki Kaisha) was prepared. In a 0.2 M aqueous solution of citric acid was then dissolved nickel hydroxide (made by Kojundo Kagaku Kabushiki Kaisha) in an amount corresponding to 0.2 M to prepare an aqueous solution of citric acid containing nickel ion. Predetermined volumes of the both solutions were measured so as to become the stoichiometric ratio of a cathode material and were mixed. After stirring for 30 minutes, the mixed solution was spray-dried by using the same dryer as in Example 1 at a spraying pressure of 1.5 MPa and an atmospheric temperature of 210° C. to give a cathode material precursor. The yield of the precursor was not less than 95%.

The dried precursor was packed in a quartz boat and sintered in oxygen at 700° C. for 10 hours to give a blackish brown powder. The cathode material obtained by this method was determined by an X-ray diffractometer, and it was confirmed thereby that the cathode material was a single phase of $LiNiO_2$ having a hexagonal crystal structure. The measurement of size of the cathode material revealed that D50 is 3.5 $\mu$m.

By using this cathode material, a coin-shaped cell was fabricated in the same manner as in Example 1, and the charge/discharge test was made in the same manner. The results are shown in Table 1.

EXAMPLE 6

A 0.2 M aqueous solution of lithium nitrate (made by Kojundo Kagaku Kabushiki Kaisha), a 0.2 M aqueous solution of manganese nitrate (made by Kojundo Kagaku Kabushiki Kaisha) and a 0.2 M aqueous solution of succinic acid (made by Wako Pure Chemical Industries, Ltd.) were prepared, and predetermined volumes of the solutions were measured so as to become the stoichiometric ratio of a cathode material and mixed. After stirring for 30 minutes, the mixed solution was spray-dried by using the same dryer as in Example 1 at a spraying pressure of 1.0 MPa and an atmospheric temperature of 220° C. to give a cathode material precursor. The yield of the precursor was not less than 95%.

The dried precursor was packed in a quartz boat and sintered in air at 800° C. for 10 hours to give a blackish brown powder. The cathode material obtained by this method was determined by an X-ray diffractometer, and was confirmed to be a single phase of $LiMn_2O_4$ having a spinel structure. The measurement of size of the cathode material revealed that D50 is 2.5 $\mu$m.

By using this cathode material, a coin-shaped cell was fabricated in the same manner as in Example 1, and the charge/discharge test was made in the same manner. The results are shown in Table 1.

EXAMPLE 7

A 0.2 M aqueous solution of lithium nitrate (made by Kojundo Kagaku Kabushiki Kaisha), a 0.2 M aqueous solution of cobalt nitrate (made by Kojundo Kagaku Kabushiki Kaisha), a 0.2 M aqueous solution of manganese nitrate (made by Kojundo Kagaku Kabushiki Kaisha) and a 0.2 M aqueous solution of citric acid (made by Wako Pure Chemical Industries, Ltd.) were prepared. Then, 1,000 ml of the 0.2 M lithium nitrate aqueous solution, 800 ml of the 0.2 M cobalt nitrate aqueous solution and 200 ml of the 0.2 M manganese nitrate aqueous solution were mixed so as to become the stoichiometric ratio of respective elements constituting a cathode material. Thereto was further added 1,000 ml of the 0.2 M citric acid aqueous solution. The resulting solution was stirred for 30 minutes and was then spray-dried by using a spray dryer (trade mark: Pulvis GP 22, made by Yamato Kagaku Kabushiki Kaisha). For the spraying of the liquid, an atomizing nozzle was used in combination with compressed air. The liquid was fed at a rate of 100 ml/minute, and the spraying was carried out at a pressure of 2.0 MPa and an atmospheric temperature of 200° C., whereby a cathode material precursor was obtained in a yield of not less than 95%.

The dried precursor was packed in a quartz boat and sintered in air at 850° C. for 10 hours to give a blackish brown powder. The cathode material obtained by this method was determined by an X-ray diffractometer (trade mark: System MXP18, made by Mac Science Kabushiki Kaisha, target: Cu—Kα radiation, lamp voltage-current: 40 kV-150 mA), and it was confirmed that the cathode material was a single phase of $LiCo_{0.8}Mn_{0.2}O_2$ having a hexagonal crystal structure. The specific surface area of the cathode material powder measured by BET method was 12.6 $m^2/g$, and the cathode material powder had uniformly distributed open pores having a size of 1 $\mu$m on average in the surface thereof.

In a glove box in an argon atmosphere, 90% by weight of the above cathode material, 5% by weight of acetylene black having an average particle size of 3.0 $\mu$m as a conductive material and 5% by weight of polyvinylidene fluoride (PVDF) as a binder component were weighed and mixed with N-methylpyrrolidone (NMP) as a solvent to give a paste. The paste was coated by a doctor blade onto an aluminum foil which served as positive electrode collector 2, vacuum-dried in an oven kept at 150° C. and pressed to give a molded body of cathode material layer 1.

Metallic lithium was used as anode material 6 and was placed in negative electrode casing 8 together with negative electrode collector 7. An ethylene carbonate (EC)/1,2-dimethoxyethane (DME)/1.0 M lithium perchlorate solution was used as an electrolyte, and was soaked into separator 5 made of a polypropylene non-woven fabric. The separator was put between the anode material 6 and the cathode material 1 and was placed in the positive electrode casing 3 together with the positive electrode collector 2, and they were closely contacted by means of gasket 4 and sealed to give a coin-shaped cell shown in FIG. 1.

The charge/discharge test of the obtained cell was made in a constant current mode of 0.1 $mA/cm^2$ current density, provided that the upper limit of the charge voltage was 4.2 V. The results are shown in Table 1. The cycling performance was also measured and found to be good.

EXAMPLE 8

A 0.2 M aqueous solution of lithium acetate (made by Wako Pure Chemical Industries, Ltd.), a 0.2 M aqueous solution of nickel acetate (made by Wako Pure Chemical Industries Ltd.), a 0.2 M aqueous solution of manganese acetate (made by Kojundo Kagaku Kabushiki Kaisha) and a 0.2 M aqueous solution of citric acid (made by Wako Pure Chemical Industries, Ltd.) were prepared. Then, 1,000 ml of the 0.2 M lithium acetate aqueous solution, 850 ml of the 0.2 M nickel acetate aqueous solution and 150 ml of the 0.2 M manganese acetate aqueous solution were mixed so as to become the stoichiometric ratio of respective elements constituting a cathode material. Thereto was further added 1,000 ml of the 0.2 M citric acid aqueous solution. The resulting solution was stirred for 30 minutes and was then spray-dried by using a spray dryer (trade mark: Pulvis GP 22, made by Yamato Kagaku Kabushiki Kaisha). For the spraying of the liquid, an atomizing nozzle was used in combination with compressed air. The liquid was fed at a rate of 100 ml/minute, and the spraying was carried out at a pressure of 1.5 MPa and an atmospheric temperature of 190° C., whereby a cathode material precursor was obtained in a yield of not less than 95%.

The dried precursor was packed in a quartz boat and sintered in air at 700° C. for 10 hours to give a blackish brown powder. The cathode material obtained by this method was determined by an X-ray diffractometer (trade mark: System MXP18, made by Mac Science Kabushiki Kaisha, target: Cu—Kα radiation, lamp voltage-current: 40 kV-150 mA), and it was confirmed that the cathode material was a single phase of $LiNi_{0.85}Mn_{0.15}O_2$ having a hexagonal crystal structure. The specific surface area of the cathode material powder measured by BET method was 17.2 $m^2/g$, and the cathode material powder had uniformly distributed open pores having a size of 0.5 $\mu$m on average in the surface thereof.

By using this cathode material, a coin-shaped cell was fabricated in the same manner as in Example 7, and the charge/discharge performance and cycling performance were measured in the same manner. The results were good. The charge/discharge performance was shown in Table 1.

EXAMPLE 9

A 0.2 M aqueous solution of lithium chloride (made by Kojundo Kagaku Kabushiki Kaisha), a 0.2 M aqueous solution of cobalt chloride (made by Kojundo Kagaku Kabushiki Kaisha), a 0.2 M aqueous solution of nickel chloride (made by Kojundo Kagaku Kabushiki Kaisha), a 0.2 M aqueous solution of manganese chloride (made by Wako Pure Chemical Industries, Ltd.) and a 0.2 M aqueous solution of citric acid (made by Wako Pure Chemical Industries, Ltd.) were prepared. Then, 1,000 ml of the 0.2 M lithium chloride aqueous solution, 450 ml of the 0.2 M cobalt chloride aqueous solution, 450 ml of the 0.2 M nickel chloride aqueous solution and 100 ml of the 0.2 M manganese chloride aqueous solution were mixed so as to become the stoichiometric ratio of respective elements constituting a cathode material. Thereto was further added 1,000 ml of the 0.2 M citric acid aqueous solution. After stirring the resulting solution for 30 minutes, it was spray-dried in the same manner as in Example 7 at an atmospheric temperature of 210° C., whereby a cathode material precursor was obtained in a yield of not less than 95%.

The dried precursor was packed in a quartz boat and sintered in air at 750° C. for 10 hours to give a blackish brown powder. The cathode material obtained by this method was determined by an X-ray diffractometer and was confirmed to be a single phase of $LiNi_{0.45}Co_{0.45}Mn_{0.1}O_2$ having a hexagonal crystal structure. The specific surface area of the cathode material powder measured by BET method was 13.0 $m^2/g$, and the cathode material powder had uniformly distributed open pores having a size of 1 μm on average in the surface thereof.

By using this cathode material, a coin-shaped cell was fabricated in the same manner as in Example 7, and the charge/discharge performance and cycling performance were measured in the same manner. The results were good. The charge/discharge performance was shown in Table 1.

EXAMPLE 10

A 0.2 M aqueous solution of lithium hydroxide (made by Kojundo Kagaku Kabushiki Kaisha) was prepared. In 1,000 ml of a 0.2 M aqueous solution of citric acid were dissolved nickel hydroxide (made by Kojundo Kagaku Kabushiki Kaisha) and manganese hydroxide (made by Wako Pure Chemical Industries, Ltd.) in a concentration of 0.2 M, respectively, in an Ni/Mn ratio of 8/2 to give an aqueous solution of citric acid containing nickel and manganese ions. The lithium hydroxide solution and the citric acid solution were mixed, stirred for 30 minutes and spray-dried in the same manner as in Example 7 at an atmospheric temperature of 220° C., whereby a cathode material precursor was obtained in a yield of not less than 95%.

The dried precursor was packed in a quartz boat and sintered in air at 700° C. for 10 hours to give a blackish brown powder. The cathode material obtained by this method was determined by an X-ray diffractometer and was confirmed to be a single phase of $LiNi_{0.45}Co_{0.45}Mn_{0.1}O_2$ having a hexagonal crystal structure. The specific surface area of the cathode material powder measured by BET method was 15.1 $m^2/g$, and the cathode material powder had uniformly distributed open pores having a size of 0.5 μm on average in the surface thereof.

By using this cathode material, a coin-shaped cell was fabricated in the same manner as in Example 7, and the charge/discharge performance and cycling performance were measured in the same manner. The results were good. The charge/discharge performance was shown in Table 1.

Other organic acids such as oxalic acid, tartaric acid, succinic acid, malonic acid and maleic acid are used in Examples 7 to 10 instead of citric acid to obtain the same effects.

Comparative Example 1

Predetermined amounts of lithium carbonate (made by Wako Pure Chemical Industries, Ltd.) and cobalt oxide (made by Wako Pure Chemical Industries, Ltd.) were weighed and mixed in a ball mill for 2 hours. The resulting mixture was packed in a quartz boat and sintered in air at 900° C. for 10 hours to give a blackish brown cathode material powder.

By using this cathode material, a coin-shaped cell was fabricated in the same manner as in Example 1, and the charge/discharge performance thereof was measured in the same manner. The results are shown in Table 1.

Comparative Example 2

Predetermined amounts of lithium carbonate (made by Wako Pure Chemical Industries, Ltd.) and nickel hydroxide (made by Wako Pure Chemical Industries, Ltd.) were weighed and mixed in a ball mill for 2 hours. The resulting mixture was packed in a quartz boat and sintered in oxygen at 750° C. for 10 hours to give a blackish brown cathode material powder.

By using this cathode material, a coin-shaped cell was fabricated in the same manner as in Example 1, and the charge/discharge performance thereof was measured in the same manner. The results are shown in Table 1.

Comparative Example 3

Predetermined amounts of lithium carbonate (made by Wako Pure Chemical Industries, Ltd.), nickel hydroxide (made by Wako Pure Chemical Industries, Ltd.) and cobalt hydroxide were weighed and mixed in a ball mill for 2 hours. The resulting mixture was packed in a quartz boat and sintered in air at 850° C. for 10 hours to give a blackish brown cathode material powder.

By using this cathode material, a coin-shaped cell was fabricated in the same manner as in Example 1, and the charge/discharge performance thereof was measured in the same manner. The results are shown in Table 1.

Comparative Example 4

Predetermined amounts of lithium nitrate (made by Kojundo Kagaku Kabushiki Kaisha) and ferric nitrate (made by Kojundo Kagaku Kabushiki Kaisha) were weighed and dissolved in deionized water in an ion concentration of 0.2 M respectively to give an aqueous solution containing lithium and iron ions. The solution was heated with vigorously stirring by a magnetic stirrer to evaporate the solvent. The obtained precursor was taken out and vacuum-dried at 200° C. for 2 hours. The precursor was packed in a quartz boat and sintered in air at 900° C. for 10 hours to give a blackish brown powder.

By using this cathode material, a coin-shaped cell was fabricated in the same manner as in Example 1, and the charge/discharge performance thereof was measured in the same manner. The results are shown in Table 1.

Comparative Example 5

Predetermined amounts of lithium nitrate (made by Kojundo Kagaku Kabushiki Kaisha) and nickel nitrate (made by Kojundo Kagaku Kabushiki Kaisha) were weighed and dissolved in deionized water in an ion concentration of 0.2 M respectively to give an aqueous solution containing lithium and nickel ions. To the solution was added a 0.2 M aqueous solution of citric acid. From the solution, the solvent was evaporated in a hot water bath of 60° C. under a reduced pressure of 1,000 Pa over 48 hours using a rotary evaporator to give a gel. The gel was taken out and vacuum-dried at 200° C. for 2 hours. The resultant was packed in a quartz boat and sintered in oxygen at 750° C. for 10 hours to give a blackish brown powder.

By using this cathode material, a coin-shaped cell was fabricated in the same manner as in Example 1, and the charge/discharge performance thereof was measured in the same manner. The results are shown in Table 1.

Comparative Example 6

Predetermined amounts of lithium acetate (made by Kojundo Kagaku Kabushiki Kaisha) and manganese acetate (made by Kojundo Kagaku Kabushiki Kaisha) were weighed and dissolved in deionized water in an ion concentration of 0.2 M respectively to give an aqueous solution containing lithium and manganese ions. To the solution was added a 0.4 M aqueous solution of ethylene glycol. The solution was heated in a hot water bath of 90° C. with vigorously stirring to evaporate the solvent and to proceed a polymerization reaction over 24 hours. The resultant was taken out and vacuum-dried at 150° C. for 2 hours. The resultant was packed in a quartz boat and sintered in air at 850° C. for 10 hours to give a blackish brown powder.

By using this cathode material, a coin-shaped cell was fabricated in the same manner as in Example 1, and the charge/discharge performance thereof was measured in the same manner. The results are shown in Table 1.

Comparative Example 7

Predetermined amounts of lithium carbonate (made by Wako Pure Chemical Industries, Ltd.), cobalt oxide (made by Wako Pure Chemical Industries, Ltd.) and manganese oxide (made by Wako Pure Chemical Industries, Ltd.) were weighed and mixed in a ball mill for 2 hours. The mixture was packed in a quartz boat and sintered in air at 900° C. for 10 hours to give a blackish brown cathode material powder of $LiCo_{0.85}Mn_{0.15}O_2$. The specific surface area of the cathode material powder measured by BET method was 5.4 $m^2/g$.

By using this cathode material, a coin-shaped cell was fabricated in the same manner as in Example 7, and the charge/discharge performance thereof was measured in the same manner. The results are shown in Table 1.

Comparative Example 8

Predetermined amounts of lithium carbonate (made by Wako Pure Chemical Industries, Ltd.), nickel hydroxide (made by Wako Pure Chemical Industries, Ltd.) and manganese hydroxide (made by Wako Pure Chemical Industries, Ltd.) were weighed and mixed in a ball mill for 2 hours. The mixture was packed in a quartz boat and sintered in oxygen at 750° C. for 10 hours to give a blackish brown cathode material powder of $LiNi_{0.85}Mn_{0.15}O_2$. The specific surface area of the cathode material powder measured by BET method was 8.9 $m^2/g$.

By using this cathode material, a coin-shaped cell was fabricated in the same manner as in Example 7, and the charge/discharge performance thereof was measured in the same manner. The results are shown in Table 1.

Comparative Example 9

Predetermined amounts of lithium carbonate (made by Wako Pure Chemical Industries, Ltd.), nickel hydroxide (made by Wako Pure Chemical Industries, Ltd.), cobalt hydroxide (made by Kojundo Kagaku Kabushiki Kaisha) and manganese oxide (made by Wako Pure Chemical Industries, Ltd.) were weighed and mixed in a ball mill for 2 hours. The mixture was packed in a quartz boat and sintered in air at 850° C. for 10 hours to give a blackish brown cathode material powder of $LiNi_{0.45}Co_{0.45}Mn_{0.1}O_2$. The specific surface area of the cathode material powder measured by BET method was 7.2 $m^2/g$.

By using this cathode material, a coin-shaped cell was fabricated in the same manner as in Example 7, and the charge/discharge performance thereof was measured in the same manner. The results are shown in Table 1.

Comparative Example 10

Predetermined amounts of lithium carbonate (made by Wako Pure Chemical Industries, Ltd.), nickel hydroxide (made by Wako Pure Chemical Industries, Ltd.) and manganese oxide (made by Wako Pure Chemical Industries, Ltd.) were weighed and mixed in a ball mill for 2 hours. The mixture was packed in a quartz boat and sintered in oxygen at 800° C. for 10 hours to give a blackish brown cathode material powder of $LiNi_{0.8}Mn_{0.2}O_2$. The specific surface area of the cathode material powder measured by BET method was 9.4 $m^2/g$.

By using this cathode material, a coin-shaped cell was fabricated in the same manner as in Example 7, and the charge/discharge performance thereof was measured in the same manner. The results are shown in Table 1.

EXAMPLE 11

The precursor obtained in Example 2 was packed in a quartz boat and sintered in air at a temperature of 500° to 800° C. for 10 hours to give blackish brown powders (Samples E1 to E4). The blackish brown powders were determined by an X-ray diffractometer, and it was confirmed that the powders (E2 and E3) obtained at sintering temperatures of 600° C. and 700° C. were in a single phase of hexagonal $LiNiO_2$. The discharge capacity thereof was measured by the same method as in the above Examples. The results are shown in Table 2. Sample E3 obtained at a sintering temperature of 700° C. showed the maximum discharge capacity of 154 mAh/g in this Example.

TABLE 2

| Sample | Sintering temperature | Phase determined (result of X-ray diffraction) | Discharge capacity (mAh/g) |
|---|---|---|---|
| E1 | 550° C. | $Li_2CO_3$, NiO (mixed phase) | unmeasurable |
| E2 | 600° C. | hexagonal $LiNiO_2$ (single phase) | 94 |
| E3 | 700° C. | hexagonal $LiNiO_2$ (single phase) | 154 |
| E4 | 800° C. | hexagonal $LiNiO_2$, cubic $LiNiO_2$ (mixed phase) | 59 |

Industrial Applicability

As explained above, the cathode material and preparation process of the present invention are used in the positive electrode of secondary lithium ion batteries and can remarkably improve the battery performances, particularly charge/discharge capacity, of the positive electrode. The secondary lithium ion batteries having an improved charge/discharge capacity are useful for miniature electronic equipments such as cellular phones and portable terminals.

What is claimed is:

1. A process for preparing cathode materials comprising the steps of obtaining an aqueous solution consisting essentially of a water-soluble salt of lithium, a water-soluble salt of at least one transition metal element selected from Ni, Co, Mn and Fe and a complexing agent capable of forming a complex with said lithium and said transition metal element, wherein a composite complex is formed in said aqueous solution, removing a solvent of said aqueous solution by spray-drying the obtained aqueous solution without changing coordination of lithium ion and at least one transition metal ion to the complexing agent to give a precursor, and sintering said precursor.

2. The process of claim 1, wherein the metal element ions in said aqueous solution are lithium ion, Ni or Co ion and Mn ion, and the ratio of lithium ion:Ni or Co ion:Mn ion is $1:1-y:y$ $(0.01 \leqq y \leqq 0.3)$.

3. The process of claim 1, wherein said water-soluble salt is any of a nitrate, a sulfate, a chloride, a fluoride, an acetate and a hydroxide.

4. The process of claim 1, wherein said complexing agent is any of oxalic acid, tartaric acid, citric acid, succinic acid, malonic acid and maleic acid.

5. The process of claim 1, wherein the atmospheric temperature in said spray-drying is from 160 to 220° C.

6. The process of claim 1, wherein the spraying pressure in said spray-drying is from 0.5 to 2.0 MPa.

7. The process of claim 1, wherein the sintering temperature is from 500 to 850° C.

8. The process of claim 5, wherein the spraying pressure in said spray-drying is from 0.5 to 2.0 MPa.

9. The process of claim 1, wherein said water-soluble salt of at least one transition metal element is a hydroxide.

10. A process for preparing cathode materials comprising the steps of obtaining an aqueous solution of a water-soluble salt of lithium, a water-soluble salt of at least one transition metal element selected from the group consisting of Ni, Co, Mn and Fe, and a complexing agent capable of forming a complex with said lithium and said transition metal element, spray-drying said aqueous solution at an atmospheric temperature of 160 to 220° C. to remove a solvent of said aqueous solution, thereby giving a precursor, and sintering said precursor.

11. The process of claim 10, wherein the metal element ions in said aqueous solution are lithium ion, Ni or Co ion, and Mn ion, and the ratio of lithium ion:Ni or Co ion:Mn ion is $1:1-y:y$ in which y is between 0.01 and 0.3.

12. The process of claim 10, wherein said water-soluble salt is a member selected from the group consisting of a nitrate, a sulfate, a chloride, a fluoride, an acetate and a hydroxide.

13. The process of claim 10, wherein said complexing agent is a member selected from the group consisting of oxalic acid, tartaric acid, citric acid, succinic acid, malonic acid and maleic acid.

14. The process of claim 10, wherein said sintering is carried out at a temperature of 500 to 850° C.

15. The process of claim 10, wherein the spraying pressure in said spray-drying is from 0.5 to 2.0 MPa.

16. A process for preparing a secondary lithium ion battery comprising the steps of:

obtaining an aqueous solution consisting essentially of a water-soluble salt of lithium, a water-soluble salt of at least one transition metal element selected from Ni, Co, Mn and Fe and a complexing agent capable of forming a complex with said lithium and said transition metal element, wherein a composite complex is formed in said aqueous solution, removing a solvent of said aqueous solution by spray-drying the obtained aqueous solution without changing coordination of lithium ion and at least one transition metal ion to the complexing agent to give a precursor, sintering said precursor to give a cathode material, mixing said cathode material with a conductive material and a binder, coating the resulting mixture onto a positive electrode collector and drying the mixture to form a cathode material layer on said positive electrode collector, and interposing a separator containing an electrolyte between said cathode material layer and an anode material layer provided on a negative electrode collector.

* * * * *